April 14, 1964 P. B. FONDÉN ETAL 3,128,972
ARRESTING DEVICES FOR AIRPLANES
Filed Jan. 12, 1962 3 Sheets-Sheet 1
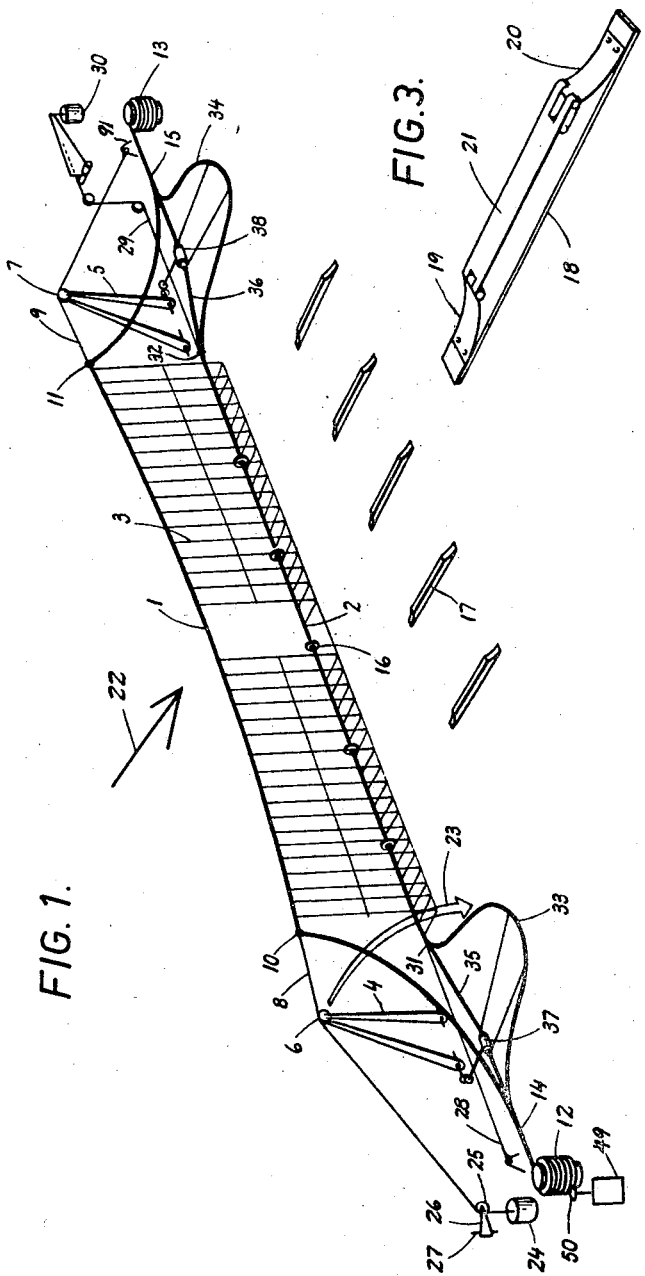
Inventors
Per B. Fondén,
Karl O. J. Wålander
by Sommers & Young
Attorneys

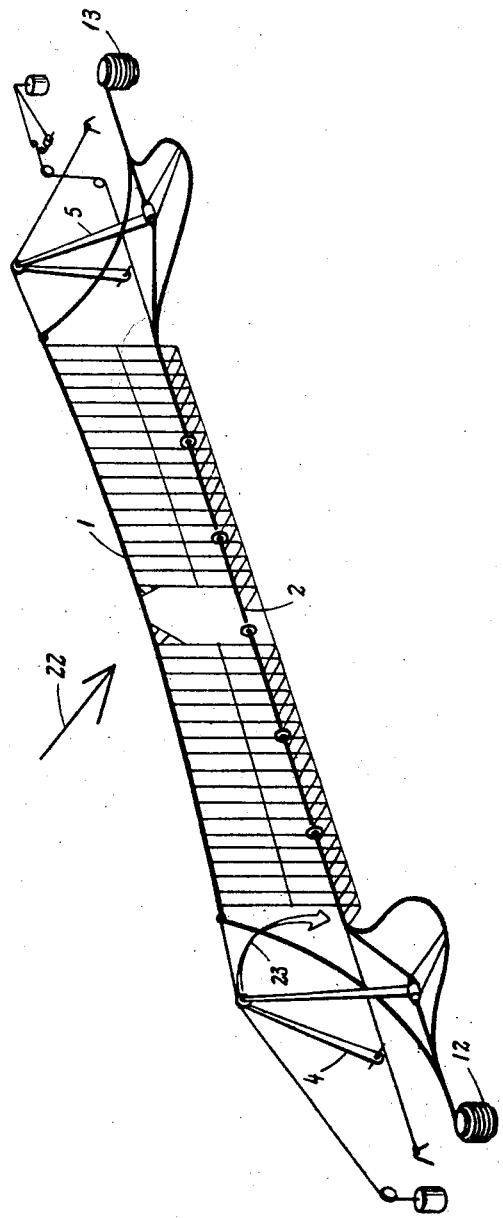

April 14, 1964 P. B. FONDÉN ETAL 3,128,972
ARRESTING DEVICES FOR AIRPLANES
Filed Jan. 12, 1962 3 Sheets-Sheet 3
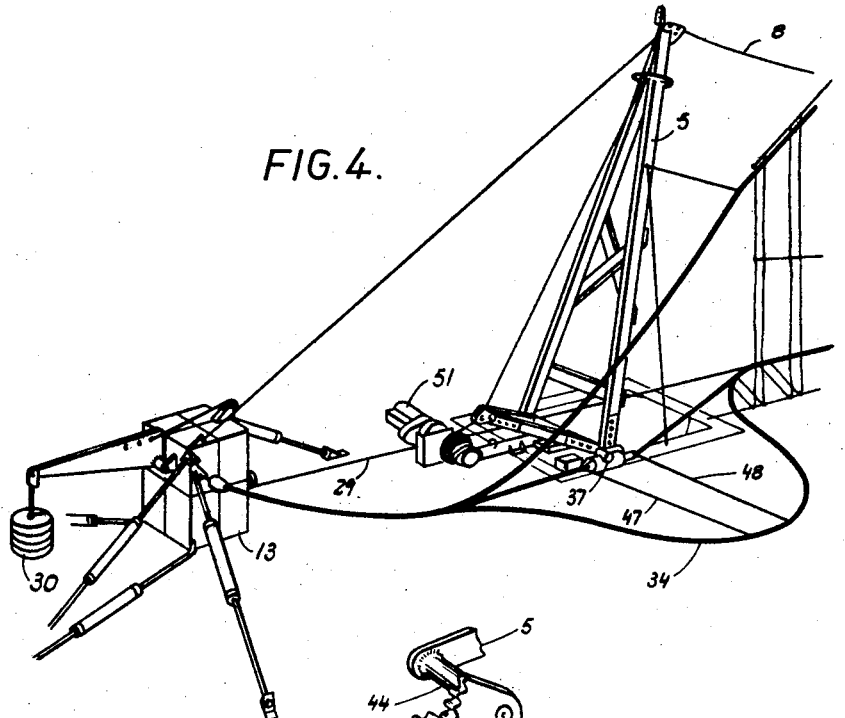
FIG. 4.
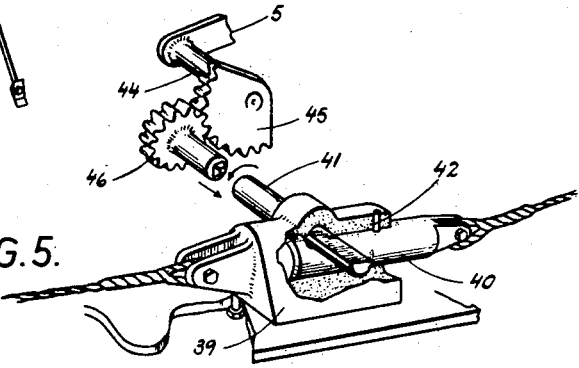
FIG. 5.
FIG. 6.
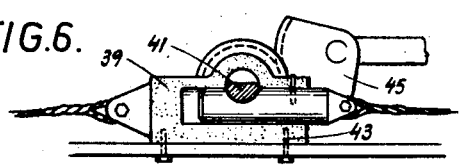
Inventors
Per B. Fondén,
Karl O. J. Wålander
by Sommers & Young
Attorneys United States Patent Office 3,128,972
Patented Apr. 14, 1964

3,128,972
ARRESTING DEVICES FOR AIRPLANES
Per B. Fondén, Hejdegatan 3, and Karl Ove Torgny
Wålander, Vasavagen 49, both of Linkoping, Sweden
Filed Jan. 12, 1962, Ser. No. 165,732
9 Claims. (Cl. 244—110)

The present invention relates to systems for arresting airplanes in landing.

There exist various systems for that purpose which for the one reason or the other cannot bring an airplane to a standstill within the area available for take-off or landing. In certain types of airplane arresting systems large nets are used to catch a landing airplane mainly by being engaged by its wings. Other types of airplane arresting systems are based on the use of cables adapted to be engaged by a hook depending from the tail portion of an airplane in landing.

Land-based airplanes, as a rule, are not provided with such arresting hooks, the arresting systems used for such airplanes being most commonly provided with nets and cables or wires for the landing gear legs of the airplane.

Arresting systems including as main element a cable for cooperation with an arresting hook depending from the airplane used as the normal means for arresting carrier-base, especially ship-based airplanes, because of the limited landing area available on a ship.

Recently, however, types of airplanes have been developed which are difficult to catch by nets, and the arresting systems having cables in front of the landing gear legs have never attained such a degree of reliability as to be considered satisfactory in practice. It may therefore be taken for granted that land-based airplanes will also be fitted with hooks for engagement with arresting cables like those used for ship-based airplanes.

The object of the present invention is to provide an arresting system for land-based airplanes of the type just described which may perform net and hook arresting operations by means of one and the same device, that is to say, without requiring any time-consuming replacement of nets by arresting cables for hooks, or vice versa, to allow the arresting device to be used for the one arresting principle or the other.

Principally, the device according to the invention comprises the combination of a net that can be raised from a horizontal position of rest to a vertical operative position, and cables so arranged as to act merely as net confining elements in the raised position of the net, while in the lowered position thereof they may also act as means for catching an arresting hook depending from the tail portion of an airplane in landing. To this end means are provided for keeping at least one of the horizontal cables of an arresting net in the lowered position of the net at a sufficient level above the surface of the landing area to allow it to be engaged by an arresting hook depending from an airplane in landing.

The above said and other features of the invention will be evident from the following description with reference to the accompanying drawings.

In the drawing, FIG. 1 is a perspective view of a net according to the invention, shown in raised position, which may be lowered by folding the respective masts to one side or the other; FIG. 2 is a perspective view of a net in raised position which may be lowered by folding the masts in a vertical plane substantially coinciding with that of the net or parallel therewith; FIG. 3 shows a detail of FIG. 1 on a larger scale; FIG. 4 is a perspective view on a larger scale of the mast and other mechanisms connected with the net and cables at one end thereof; FIG. 5 is a perspective view, on a still larger scale, of a cable locking device belonging to the mechanism shown in FIG. 4; FIG. 6 is a side elevation of said locking device.

The net shown in FIGS. 1 and 2 comprises an upper cable 1, a lower cable 2 and a plurality of connecting ropes or wires 3 therebetween. Since in the raised position of the net the length of said connecting ropes is greater than the distance between the cables 1 and 2 and the cables are slightly displaced with relation to each other in the transverse direction of the net the ropes 3 will form a L-shaped configuration in said position of the net, as shown. The cable 1 with the net is supported by a pair of masts 4 and 5, through the intermediary of ropes or wires 8 and 9, passed over pulleys 6 and 7, respectively, mounted at the top of the masts 4 and 5. The ropes 8 and 9 are connected to the upper cable 1 of the net by means of couplings 10 and 11, respectively, of such a nature as to be released from cable 1, when the net is engaged by an airplane in landing. This is for the purpose of subjecting the airplane to a soft braking action by means of brakes 12 and 13 connected to the ends of the cables 1 and 2 of the net by brake cables 14 and 15, respectively, which unwind from the brake drums during the arresting period.

In the lowered position of the net the upper and lower cables 1 and 2 thereof can act as arresting cables in cooperation with hooks depending from airplanes in landing. To this end means are provided to keep at least one of the cables on a certain level above the surface of the landing area in order to allow the cable or cables to be caught by a depending arresting hook.

In the embodiment shown in FIGS. 1 and 2, said means comprise in respect of the lower cable 2 a set of pulleys 16 rotatably mounted on said cable. As far as the upper cable 1 is concerned there is shown in FIG. 1 a set of bearers 17 provided on the runway for said cable when the net is dragged along by a landing airplane. In order that the bearers 17 shall not form an obstacle to the landing gear of the airplane they may preferably be compressible, for instance, by being so constructed as shown in FIG. 3. Here, the numeral 18 designates a base plate carrying near its ends two blade springs 19 and 20 supporting between their elevated ends a plate 21 on a certain level above base plate 18.

In FIGS. 1 and 2 the reference numeral 22 designates an arrow 22 to indicate the direction in which an airplane approaches the net, and the reference numeral 23 designates arrows indicating the folding directions of the masts.

Cable 1 is kept taut even in its lowered position by the action of a weight 24 carried by the supporting rope 8, as shown in FIGS. 1 and 2, said rope to this end being passed over a pulley 25 supported, as shown in FIG. 1, by an arm 26 swingably mounted on a vertical pinion 27. The supporting rope 9 connected to cable 1 at the other end of the net is anchored to the ground, as indicated at 91.

Attached to the lower cable 2 at opposite ends of the net are ropes or wires 28 and 29. Rope 28 is anchored to the ground, as shown. Rope 29 supports by its end remote from the net a weight 30 acting to keep cable 2 taut. Inserted between the ropes or wires 28 and 29, on the one hand, and cable 2 on the other hand are couplings 31 and 32, respectively, of such a nature as to be released from cable 2 when the net is engaged by a landing airplane.

Normally, the lower cable 2 is made longer than the upper cable 1. Only in exceptional cases the two cables are of equal lengths. The reason for said unequal lengths of the cables 1 and 2 is to allow the net to wrap itself round the airplane in a certain way. This means that when the net is lowered the lower cable cannot be stretched from one brake to the other, unless there is a considerable excess length. This, however, is not allowable in respect of hook arresting because of the mass forces then arising. The problem arising is solved according to the invention by providing excess portions 33 and 34 of the lower cable 2 on its extension between the ends of the net and the brakes 12 and 13, respectively, and inserting shorter cable sections 35 and 36 as shunts to the portions 33 and 34, respectively. Each of said shorter sections 35 and 36 comprises two halves and inserted between the halves of each section 35 and 36 is a coupling 37 or 38, hereinafter referred to as "locks," by the unlocking of which the respective halves are released from each other so as to bring the portions 33 and 34 into action.

In FIGS. 5 and 6 the construction of locks 37 and 38 is shown in detail. The lock comprises two main members 39 and 40. Member 39 is substantially shaped as a sleeve, having a bottomed hole and member 40 is, substantially, a pin engaging said hole. The pin member 40 is formed with a transversely extending groove forming part of a transverse boring the remainder of which is drilled in an upper projection of sleeve-member 39, as is best shown in FIG. 6. Rotatably mounted in said transverse boring is a locking pin 41, the portion of which engaging the transverse boring being of semi-circular cross-section.

With the locking pin 41 in the position shown in FIG. 6 the members 39 and 40 are locked to each other. To unlock them pin 41 should be rotated through half a revolution so as to get rid of the recess of pin 40.

In order to hold the members 39 and 40 together even after the pin 41 has been brought to unlocked state as described, shear pins 42 are provided which hold members 39 and 40 together while the masts are being raised or lowered. As will appear from FIG. 6, member 39 is attached to a base element by means of shear pins 43.

The locks 37 and 38 can be actuated by the raising or lowering movement of the masts 4 and 5 in such a way as to be locked when the masts are lowered and unlocked when the masts are raised. This will be evident from FIG. 5, where part of mast 4 is shown in its lowered position. The mast is connected by means of a shaft 44 and a toothed segment 45 to a gear 46 on a shaft that can be coupled to pin 41. When mast 4 is turned upwards, as indicated by an arrow in FIG. 5, pin 41 is rotated to its unlocking position, thereby allowing the net to arrest an airplane without hindrance from cable 35. The same comments apply to the lock controlled by mast 5.

The lowering and raising of the masts may be controlled either mechanically or electrically.

As will appear from FIG. 4, the two members 39 and 40 of a lock (as 38) connecting the two halves of a shunting cable section (as 36) are connected to the respective shunted cable portion (as 34) by individual ropes or wires 47 and 48 of such a length as to keep the lock members 39 and 40 close to said shunted cable portion after they are released from each other and the shunted cable portion is stretched taut.

As indicated in FIG. 1 in respect of brake 12 the brakes 12 and 13 may each be combined with means, as for instance, an electric motor, indicated at 49, connected to the brake drum by means of a toothed or friction gear, as indicated at 50, for winding an appropriate length of the brake cables on the drum when the net is lowered, and unwinding said length when the net is raised.

With reference to FIG. 4 the numeral 51 designates a motor controlled device for raising and lowering the adjacent mast.

We claim:

1. An arresting device for airplanes comprising in combination, a net to be stretched across a runway for airplanes, said net comprising upper and lower parallel bounding cables and a plurality of connecting wires extending therebetween, a brake situated outside each end of the net, the ends of the cables extending beyond each end of the net being connected in common to the respective brake, foldable masts at opposite ends of the net for allowing raising and lowering of said net, means for keeping the net stretched between the masts, and means for keeping one net bounding cable at least raised from the runway in the lowered position of the net so as to allow said cable to be engaged by a hook depending from an airplane to be arrested.

2. An arresting device as claimed in claim 1, in which the means for keeping one of the net bounding cables raised from the runway comprises a plurality of supporting members for allowing the cable in the lowered state of the net to move along the runway while being held on a certain level thereabove.

3. An arresting device as clamied in claim 1, in which the means for keeping one of the net bounding cables raised from the runway comprises means on the runway behind the net as reckoned in the direction of movement of a landing airplane for keeping said one net bounding cable at least on a sufficient level above the runway for allowing it to be engaged by an arresting hook depending from an airplane to be arrested.

4. An arresting device as claimed in claim 1, in which the means for keeping the net stretched between the masts comprises wires connected to the net bounding cables at points situated at opposite ends of the net and weights supported by said wires for keeping the net bounding cables under a practically constant tension for allowing their function as hook arresting cables.

5. An arresting device as claimed in claim 1, in which the portions of the lower net bounding cable at least situated between the ends of the net and the respective brakes are shunted by cable sections of shorter length than said portions, means being provided in combination with said shorter sections for bringing them out of action when it is desired to bring the shunted portions into operative state.

6. An arresting device as claimed in claim 5, in which each of said shorter cable sections comprises two halves releasably connected together by means of a lock including two members connected each to a separate one of said halves, and in which said lock members are connected to the respective shunted cable portion by means of individual wires of such lengths as to keep the lock members close to said cable portion, when the latter is held taut after disconnection of the two halves of the respective shorter cable section from each other by opening the lock.

7. An arresting device as claimed in claim 6, in which means are provide for operating said locks under the control of the masts in such a way as to secure the members of the locks to each other upon the lowering of the masts and to release them from each other upon the raising of the masts.

8. An arresting device as claimed in claim 7, in which said means are of mechanical nature.

9. An arresting device as claimed in claim 7, in which means are provided to maintain the two members of each lock in engagement with each other by a slight retaining force during the raising and lowering of the masts.

References Cited in the file of this patent

UNITED STATES PATENTS

| 2,526,541 | Colley | Oct. 17, 1950 |
| 3,010,683 | Cotton | Nov. 28, 1961 |

FOREIGN PATENTS

| 1,222,670 | France | Jan. 25, 1960 |